Dec. 8, 1925.
G. VINNEMEIER
METER
Filed Feb. 28, 1925
1,564,649
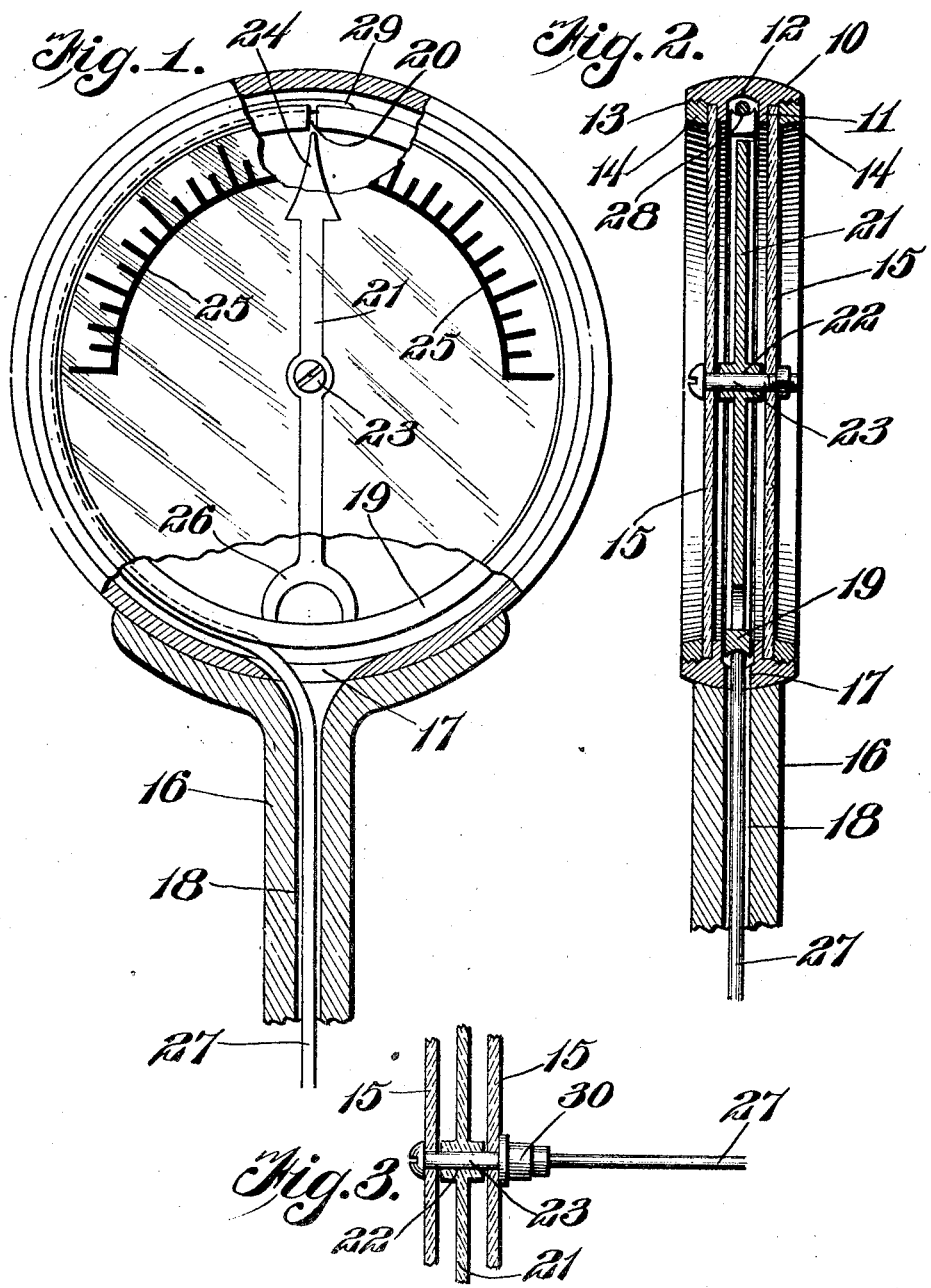

Patented Dec. 8, 1925.

1,564,649

UNITED STATES PATENT OFFICE.

GERHARD VINNEMEIER, OF IOLA, KANSAS.

METER.

Application filed February 28, 1925. Serial No. 12,369.

*To all whom it may concern:*

Be it known that I, GERHARD VINNEMEIER, a citizen of the Republic of Germany, residing at Iola, in the county of Allen and State of Kansas, have invented certain new and useful Improvements in Meters, of which the following is a specification, reference being had to the accompanying drawings.

This invention relates to meters and more particularly to the construction of a meter to be operated by a control element such as a piece of Bowden wire.

An important object of the invention is to provide a device of this character which may be very readily and cheaply constructed and which is very easily assembled.

A further object of the invention is to provide a device of this character which is readable from opposite sides thereof having opposed transparent walls through which the indicating pointer may be observed, these walls providing a support for the pointer and for the rotating element of the indicator.

Other objects and advantages lie in the details of construction as illustrated in the accompanying drawings, wherein for the purpose of illustration is shown a preferred embodiment of my invention and wherein:—

Figure 1 is a side elevation of a rotary indicator constructed in accordance with my invention, portions of the indicator being broken away to show the internal construction;

Figure 2 is a vertical sectional view through the indicator; and

Figure 3 is a detailed sectional view showing a further manner of connecting an operating mechanism with the gauge.

Referring now more particularly to the drawings, the numeral 10 designates a circular rim, the inner perimeter of which has projecting inwardly therefrom approximately centrally thereof a flange 11 formed centrally with a slot 12 dividing the flange into spaced arms. The inner face of the rim outwardly of the flange 11 and at opposite sides thereof is screw-threaded, as at 13, for the reception of threaded retaining rims 14 by means of which transparent side walls 15 of the dial are maintained in position and held against rotation. This rim is adapted to be supported from a suitable standard 16 and has an opening 17 connecting the groove or channel 12 with a bore 18 formed in the standard 16.

A rotating indicator element is provided comprising a split annulus 19 of resilient material, this annulus having secured thereto at a point opposite the split 20 thereof a pointer 21 extending diametrically of the annulus and provided centrally thereof with a pivot opening 22. This opening receives a shaft 23 directed through the side walls 15. The free end of the pointer element is preferably sharpenly pointed and in the form of an arrow head, as indicated at 24, and the side walls 15 have provided thereon a scale 25 to indicate the degree of circumferential shift of the annulus 19.

It will be obvious that as the annulus is rotated, the position of the arrow with relation to the dial would change indicating the degree of rotation. An indicator of this character is particularly adapted for use in connection with steering meters or similar devices where the position of an element must be determined or as an inclinometer. This latter use may be readily had by simply throwing the major portion of the weight to the bottom of the annulus and this may be readily effected by enlarging the pointer element at the point of attachment, as indicated at 26. Any one of several methods may be employed for imparting rotation to the annulus. When the device is employed as an inclinometer, the force of gravity will, of course, impart this motion.

In the preferred use of the device, however, which is in the first capacity mentioned, this motion is imparted by directing through the bore 18 of the standard 16 a Bowden wire 27 which is passed through the groove 12 and between the adjacent faces of the annulus and the face of the groove of the channel 28 formed therebetween and is attached to the annulus adjacent the point of split thereof, as indicated at 29. It will be obvious that if this Bowden wire is withdrawn from or forced into the tube formed by the standard 16, it will cause a rotation of the annulus and accordingly of the pointer. If desired, this Bowden wire may be directly connected to one end of the shaft, as generally indicated in Figure 3 at 30 and the Bowden wire rotated. Attention is directed to the fact that the construction of the rim and annulus are such that the annulus may be compressed to permit its insertion within the channel 12 and the annulus when released will spring to its normal size so that its external diameter is greater than the internal diameter of the flange preventing its accidental removal and holding the pointer at the center of the space between the walls 15.

It will be obvious that this structure may be very readily and cheaply produced and being simple in its nature will be relatively long life in service. Since the structure hereinbefore set forth is obviously capable of a considerable range of change and modification without in any manner departing from the spirit of my invention I accordingly do not limit myself to such specific structure except as hereinafter claimed.

I claim:—

1. In a rotary indicator, a stationary circular outer rim having an inwardly projecting flange upon its inner surface and intermediate the side edges thereof, said flange having an annular groove formed therein, a split annulus of greater diameter than the internal diameter of the flange arranged within said groove and having a pointer extending diametrically thereof, side walls for said indicator permitting observation of said pointer and an axis for the annulus supported by said side walls and directed through said pointer.

2. In a rotary indicator, a stationary circular outer rim having an inwardly projecting flange upon its inner surface and intermediate the side edges thereof, said flange having an annular groove formed therein, a split annulus of greater diameter than the internal diameter of the flange arranged within said groove and having a pointer extending diametrically thereof, side walls for said indicator permitting observation of said pointer, an axis for the annulus supported by said side walls and directed through said pointer, the inner face of said rim at opposite sides of said flange being threaded and retaining rims engaged with said threads for maintaining said side walls in position against the flange.

3. In a rotary indicator, a stationary circular outer rim having an inwardly projecting flange upon its inner surface and intermediate the side edges thereof, said flange having an annular groove formed therein, a split annulus of greater diameter than the internal diameter of the flange arranged within said groove and having a pointer extending diametrically thereof, side walls for said indicator permitting observation of said pointer, an axis for the annulus supported by said side walls and directed through said pointer, and means for rotating said annulus including a member directed through an opening in the wall of the rim and engaging the annulus to rotatably shift the same, said annulus having its periphery spaced from the adjacent wall of the groove to thereby provide a housing space for said operating member.

In testimony whereof I hereunto affix my signature.

GERHARD VINNEMEIER.